US009473839B2

(12) United States Patent
Yu

(10) Patent No.: US 9,473,839 B2
(45) Date of Patent: Oct. 18, 2016

(54) SPEAKER DEVICE FOR TELEVISION

(76) Inventor: Kookil Yu, Seoul (KR)

( * ) Notice: Subject to any disclaimer, the term of this patent is extended or adjusted under 35 U.S.C. 154(b) by 0 days.

(21) Appl. No.: 14/419,018

(22) PCT Filed: Aug. 31, 2012

(86) PCT No.: PCT/KR2012/006969
§ 371 (c)(1),
(2), (4) Date: Feb. 2, 2015

(87) PCT Pub. No.: WO2014/021495
PCT Pub. Date: Feb. 6, 2014

(65) Prior Publication Data
US 2015/0215692 A1 Jul. 30, 2015

(30) Foreign Application Priority Data
Aug. 3, 2012 (KR) .................. 10-2012-0085004

(51) Int. Cl.
H04R 1/02 (2006.01)
H04N 5/64 (2006.01)
H04N 5/655 (2006.01)
H04N 5/60 (2006.01)
(Continued)

(52) U.S. Cl.
CPC ............. *H04R 1/028* (2013.01); *H04N 5/642* (2013.01); *H04N 5/655* (2013.01); *H04N 5/60* (2013.01); *H04R 1/24* (2013.01); *H04R 5/02* (2013.01); *H04R 2499/15* (2013.01)

(58) Field of Classification Search
CPC .......... H04R 2499/15; A47B 21/0073; A47B 81/064
See application file for complete search history.

(56) References Cited

U.S. PATENT DOCUMENTS 5,797,666 A * 8/1998 Park ................... A47B 21/0073
312/223.3
6,494,150 B1 * 12/2002 Phoenix ................ A47B 51/00
108/147
6,612,670 B2 * 9/2003 Liu .................... A47B 21/0073
160/351

(Continued)

FOREIGN PATENT DOCUMENTS

JP 2000-221922 8/2000
JP 2004-184768 7/2004

(Continued)

OTHER PUBLICATIONS

International Search Report Dated Feb. 5, 2013 From the Korean Intellectual Property Office Re. Application No. PCT/KR2012/006969 and Its Translation Into English.

Primary Examiner — Curtis Kuntz
Assistant Examiner — Ryan Robinson

(57) ABSTRACT

The present invention relates to a speaker device for a television, comprising: a body having a space formed therein for accommodating the television and an open top, wherein the body serves as an enclosure when the television is lifted; an elevating means for moving the television in upward and downward directions in the body; a speaker arranged on the front surface of the body; and a support arranged beneath the main body. The space is formed in the body when the television is lifted in the body by the elevating means, and the sound provided from the speaker arranged on the front surface of the body is clean and clear as the body serves as an enclosure. The speaker device of the present invention uses the single body to accommodate the television and as an enclosure of the speaker, and therefore, the television may have a smaller thickness.

4 Claims, 10 Drawing Sheets

(51) Int. Cl.
*H04R 1/24* (2006.01)
*H04R 5/02* (2006.01)

(56) References Cited

U.S. PATENT DOCUMENTS

| | | | | |
|---|---|---|---|---|
| 7,075,587 | B2* | 7/2006 | Lee | H04N 5/44513 348/563 |
| 7,128,003 | B2* | 10/2006 | Okninski | A47B 81/064 108/147 |
| 8,678,523 | B2* | 3/2014 | Carr | A47B 81/064 312/306 |
| 2002/0101139 | A1* | 8/2002 | Lee | A47B 21/0073 312/196 |
| 2004/0090149 | A1* | 5/2004 | Chang | A47B 21/0073 312/7.2 |
| 2005/0275323 | A1* | 12/2005 | Wilhelm | A47B 9/04 312/319.5 |
| 2006/0076860 | A1* | 4/2006 | Hoss | A47B 51/00 312/312 |
| 2007/0035671 | A1* | 2/2007 | Ryu | H04N 5/64 348/794 |

FOREIGN PATENT DOCUMENTS

| | | |
|---|---|---|
| JP | 03-862851 | 10/2006 |
| JP | 2007-108677 | 4/2007 |
| JP | 2007-281734 | 10/2007 |
| KR | 10-2005-0065049 | 6/2005 |
| KR | 10-0558440 | 3/2006 |
| KR | 10-2007-0018556 | 2/2007 |
| KR | 10-2011-0015130 | 2/2011 |
| WO | WO 2014/021495 | 2/2014 |

* cited by examiner

SPEAKER DEVICE FOR TELEVISION

RELATED APPLICATIONS

This application is a National Phase of PCT Patent Application No. PCT/KR2012/006969 having International filing date of Aug. 31, 2012, which claims the benefit of priority of Korean Patent Application No. 10-2012-0085004 filed on Aug. 3, 2012. The contents of the above applications are all incorporated by reference as if fully set forth herein in their entirety.

TECHNICAL FIELD

The present invention relates to a speaker device for a television, and in particular to a speaker device for a television which makes it possible to generate clean and clear quality sound, while allowing the sound of the speaker installed at the television to orient toward the forward direction of the television.

BACKGROUND ART

In case of a LCD television or a LED television which is currently available, as a growing trend, the thickness of such a LCD television or LED television in general becomes very thin, and a bezer configured to fix a screen (display) becomes also very thin.

That the bezer is made thin, is intended to enhance an esthetic sense, and that the screen of 42 inches, 52 inches, etc. is made, is intended to satisfy a customer's preference and demand.

Since the thickness of the bezer for fixing the screen is very thin, it is hard for the speaker of the television to orient toward the forward direction, so the speaker in general is installed at the backside of the television.

That the speaker is installed at the backside of the television, is because of the too thin thickness of the bezer and it needs to form an enclosure for properly transferring the sound of the speaker. However, since the thickness of the bezer is too thin, it is hard to install the speaker.

In addition, there is a problem in that if the speaker is installed at the backside of the television, the sound of the speaker collides with a wall surface, etc. of where the television is installed, thus spreading the sound to the sides of the television, not transferring toward the forward direction of the television, so a television viewer may not well listen to the sound from the speaker.

Since the sound is not transferred toward the forward direction of the television, the television viewer tends to volume up and up, for which the surrounding of where the television is installed may become noisy because of the sound of the television.

If the sound from the television becomes loud and loud, there may be a conflict between neighbors who live at a complex residential area such as an apartment, etc., and in case of a home where a student lives, the student may suffer from such things, which may results in a problem in studying.

DISCLOSURE OF INVENTION

Technical Problem

Accordingly, it is an object of the present invention to provide a speaker device for a television which is characterized in that when watching a television, the sound may be outputted toward the direction of where a television viewer is positioned, and when the sound is outputted from the speaker, the sound transferred with the aid of an enclosure may be generated in various forms.

In addition, it is another object of the present invention to provide a speaker device for a television wherein a television viewer may attach or detach the speaker as the television viewer desires.

It is further another object of the present invention to provide a speaker device for a television which is characterized in that the sound of the speaker installed at a backside of a currently available LCD television, LED television, etc. may be outputted toward the forward direction of the speaker, namely, may be transferred based on the volume level of the sound that the television viewer sets.

In addition, it is still further another object of the present invention to provide a speaker device for a television which may make it possible to resolve the problems in that the sound of the television becomes louder, in such a way that the sound of the television may be properly transferred to the television viewer, and the noise occurs because of the sound of the television.

In addition, it is still further another object of the present invention to provide a speaker device for a television which is characterized in that when not watching the television, the speaker is embedded inside of a backside of the television or a cover of the backside of the television, and only when watching the television, the speaker may come out, thus preventing any degradation of an aesthetic sense of the television itself when not watching the television.

In addition, it is still further another object of the present invention to provide a speaker device for a television which is characterized in that a speaker itself may form an enclosure as compared with the related art wherein the cover of the backside of the television has played a role as an enclosure of the speaker, so the sound from the speaker may be transferred as clean and clear quality sound when listening to mono or stereo sound or music broadcast or when watching movie, news, etc.

In addition, it is still further another object of the present invention to provide a speaker device for a television which makes it possible to prevent hearing impairment which occurs because of the sound of the television when the sound is not properly transferred as in the prior art.

In addition, it is still further another object of the present invention to provide a speaker device for a television which is characterized in that a barrel-shaped configuration due to the attachment of a backside cover of the currently available LCD television, LED television, etc. may become slim in such a way to separate the speaker from the body of the television, thus acquiring a thinner thickness of the television.

In addition, it is still further another object of the present invention to provide a speaker device for a television which is characterized in that the configuration of a position change unit may differ based on the environment of where the television is installed with the aid of the position change unit which may change of the speaker thus reducing any limitations in installation space of the television.

Solution to Problem

To achieve the above objects, there is provided a speaker device for a television which may include a body which includes a space inside of the body for accommodating the television, wherein the top of the body is open, and the body plays a role of an enclosure when the television is lifted; an ascending and descending means which is installed inside of the body for ascending and descending the television; a speaker which is installed at a front surface of the body; and a support which is installed at the bottom of the body.

In addition, the ascending and descending means may include a fixing unit which is installed at the bottom of the television; a bracket which is secured to the fixing unit; an engaging protrusion which has a via hole at both sides of the bracket and is integrally formed; a worm which is fixed at a fixing member at the top and bottom of which a bearing is disposed, thus transferring rotating force to the engaging protrusion; a worm wheel which is engaged so as to transfer the rotating force to the worm; a decelerator which is engaged so as to transfer the decelerated rotating force to the worm wheel; and a motor which is secured to one side of the decelerator for transferring rotating force and is installed inside of the body.

In addition, the ascending and descending means may include a fixing unit which is installed at the bottom of the television; a bracket which is secured to the fixing unit; a plurality of first pulleys which is installed at the bottom of the bracket; a second pulley which is installed inside of the body while being distanced by a predetermined interval from the bracket; a wire which is hung over the first pulleys and the second pulley; a decelerator pulley which is configured to wind or unwind the wire; a decelerator which is engaged for the decelerator pulley to rotate with a predetermined constant rotating force; and a motor which is secured to one side of the decelerator for transferring rotating force and is installed inside of the body.

In addition, the ascending and descending means may include a fixing unit which is installed at the bottom of the television; a bracket which includes a bracket protrusion and is installed at the bottom of the fixing unit; an ascending and descending bar which is installed in a X-shape at the fixing unit; a moving member which is installed at the bottom of the ascending and descending bar; a gear rod which is engaged with the moving member, thus transferring rotating force; a decelerator which is installed at one side of the gear rod; and a motor which is secured to one side of the decelerator for transferring rotating force and is installed inside of the body.

In addition, the speaker may be detachably installed at a front surface of the body.

In addition, the speaker and a monitor are integrally formed at a front surface of the body.

Advantageous Effects

The present invention is advantageous in that the interior of the body may have a space in a state where the television is raised upward in the body by means of an ascending and descending means. At this time, the speaker installed at the front surface of the body may have a role of the enclosure, so the sound from the speaker may be transferred as clean and clear sounds.

In addition, since one body may serve to accommodate the television and may be used as an enclosure of the speaker, there may be an effect in that the television may be made thinner.

In addition, since the body may accommodate the television, a television watching time of kids may be randomly regulated.

The present invention has effects in that the sound of the speaker installed at a backside of the currently available LCD television, LED television, etc. may be transferred toward the forward direction, namely, may be transferred based on the volume level of the sound that the television viewer sets.

In addition, the present invention has effects in that noises due to the sound of the television may be prevented while preventing the increases of the sound of the television in such a way to properly transfer the sound of the television to the television viewer.

In addition, the present invention has effects in that when the television viewer does not watch the television, the speaker is embedded inside of a backside of the television or inside of a cover of the backside of the television, and only when watching the television, the speaker comes out, thus enhancing an esthetic sense while not watching the television.

In addition, the present invention has effects in that a speaker itself may form an enclosure as compared with the related art wherein the cover of the backside of the television has played as an enclosure of the speaker, so the sound from the speaker may be transferred as clean and clear quality sound when listening to mono or stereo sound or music broadcast or when watching movie, news, etc.

In addition, the present invention has effects in that it is possible to prevent hearing impairment which occurs because of the sound of the television when the sound is not properly transferred as in the prior art.

In addition, the present invention has effects in that a barrel-shaped configuration due to the attachment of a backside cover of the currently available LCD television, LED television, etc. may become slim in such a way to separate the speaker from the body of the television, thus acquiring the thinner thickness of the television.

In addition, the present invention has effects in that the configuration of a position change unit may differ based on the environment of where the television is installed with the aid of the position change unit which may change of the speaker thus reducing any limitations in installation space of the television.

BEST MODES FOR CARRYING OUT THE INVENTION

The speaker device for a television according to the present invention will be described with reference to the accompanying drawings.

Figure 1:
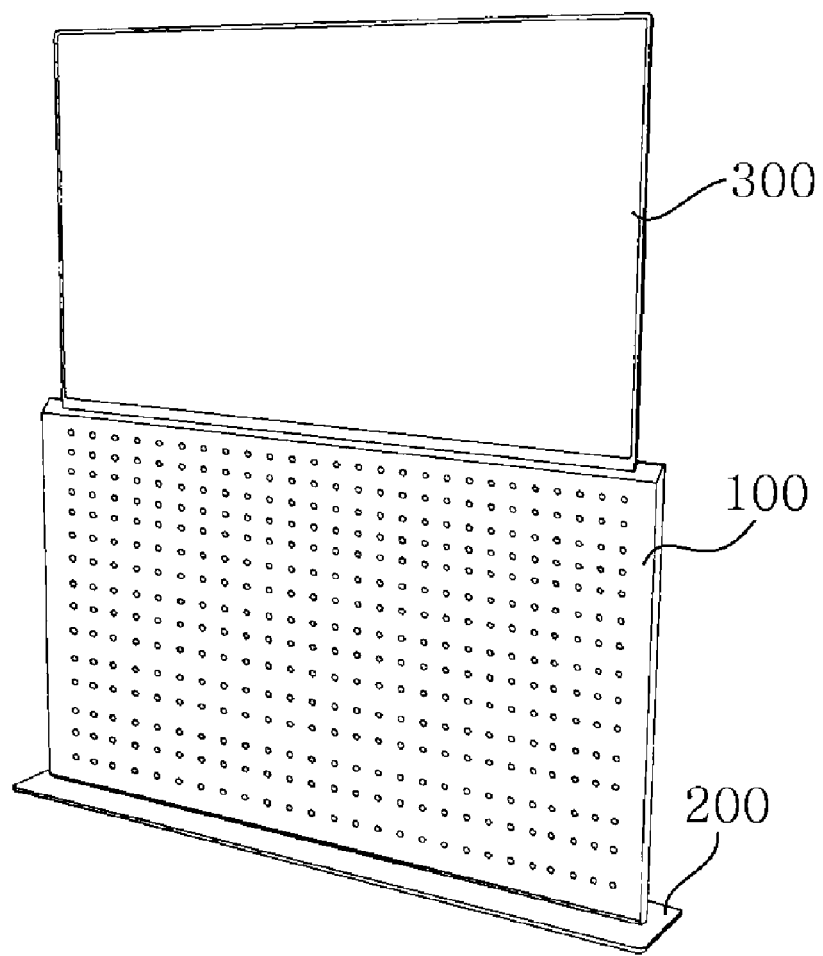
FIG. 1 is a perspective view illustrating a speaker device for a television according to the present invention.
Figure 3:
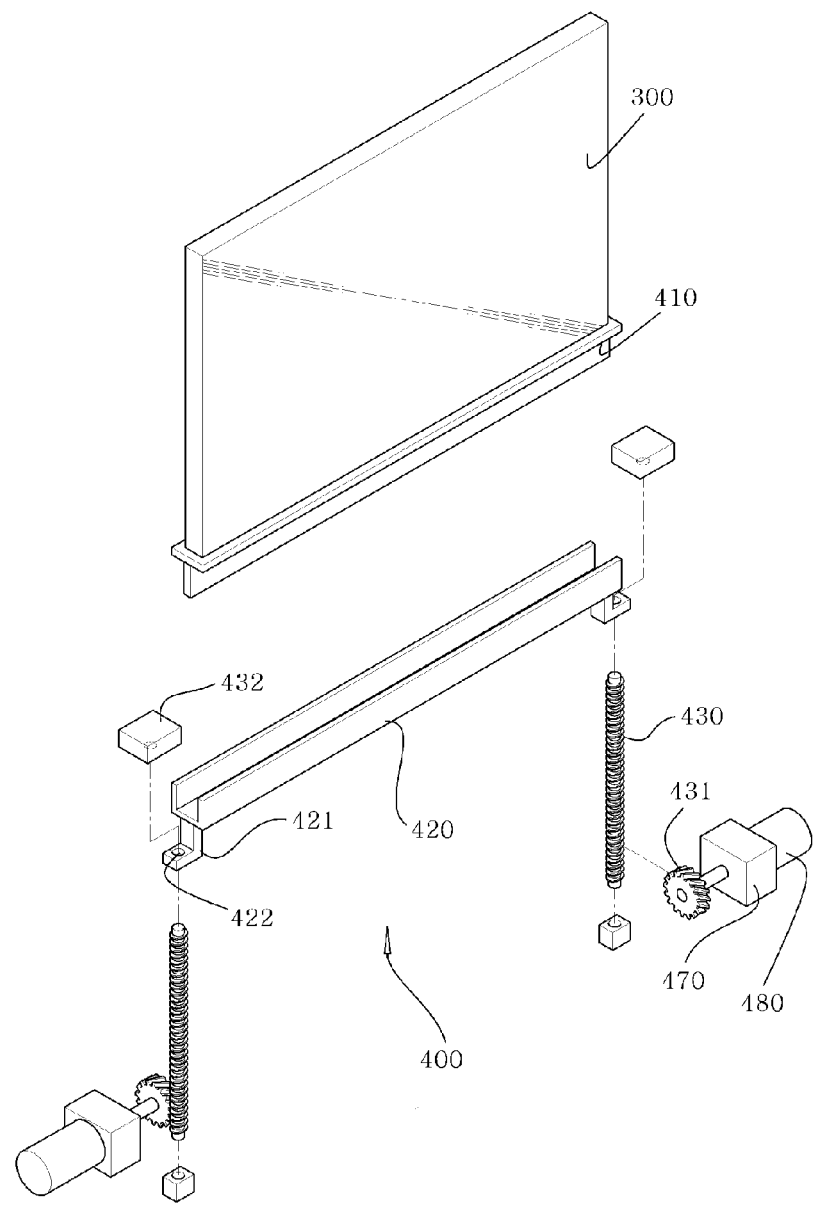
FIG. 3 is a view illustrating a configuration of the ascending and descending means in Figure.

FIG. 1 is a perspective view illustrating a speaker device for a television according to the present invention, and FIG. 3 is a view illustrating a configuration of the ascending and descending means in FIG. 1.

Figure 2:
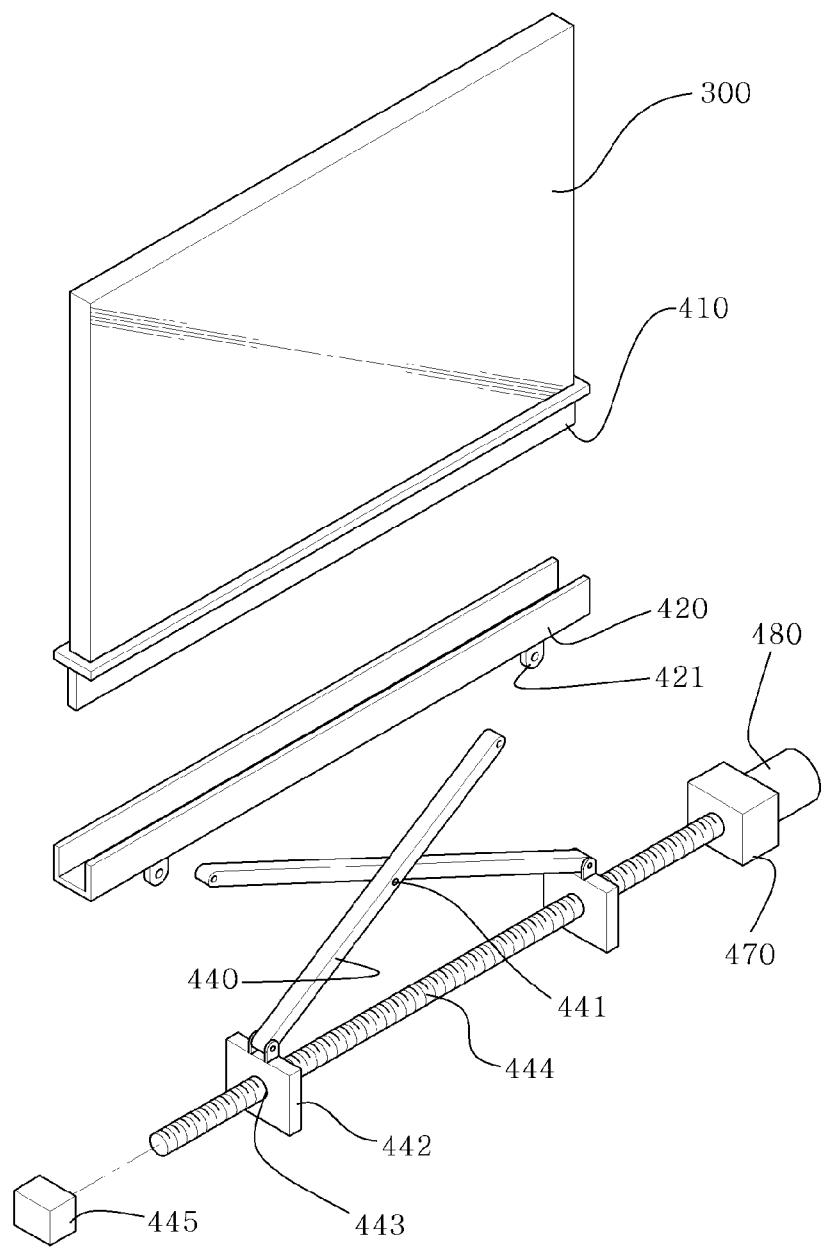
FIG. 2 is a view illustrating a configuration according to another exemplary enibodiment in Figure.

As illustrated in FIGS. 1 and 2, the speaker device for a television according to the present invention may include a body, a support, an ascending and descending means, and a speaker.

The body 100 may include at its inner side a space for accommodating the television 300 and an open top through which the accommodated television may come out.

In addition, it is characterized in that when the television comes out of the body 100, the body 100 may be used as an enclosure of the speaker 500.

The ascending and descending means 400 may include a fixing unit 410 at the bottom of the television 300, and a bracket 420 with an engaging protrusion 421 may be formed at both sides of the fixing unit 410.

The engaging protrusion 421 may include a via hole 422, and gears may be disposed inside of the via hole 422.

At the via hole 421 of the engaging protrusion 421, a worm 430 may be disposed so as to move the bracket 420 in upward and downward directions. At the top and bottom of the worm 430, a fixing member 432 with a bearing may be disposed. A worm wheel 431 is engaged with the worm 430, thus providing rotating force for the worm 430 to rotate in the normal or reverse direction.

A decelerator 470 is engaged to the worm wheel 431 for transferring a predetermined rotating force, and a motor 480 is secured to one side of the decelerator 470.

The thusly constituted present invention is characterized in that when a television viewer turns on the television 300 to watch, the television 300 is turned on, and electric power is supplied to the motor 480.

The electric power supplied to the motor 180 is set to be supplied for a predetermined time period. More specifically, the electric power is set to be supplied until the television 300 fully comes out above the top of the body 100.

The driving force of the motor 180 may be transferred as rotating force to the decelerator 470 installed at its one side, and the decelerator 470 may output a predetermined rotating force, and at the same time, may output a revolution which is less than the rotating force of the motor 480.

The rotating force outputted from the decelerator 470 may be transferred to the worm wheel 431 installed at its one side, and the rotating force transferred to the worm wheel 431 may be transferred to the worm 430 again, thus rotating the worm 430.

Since the worm 430 is fixed at the fixing member 432 at the top and bottom of which a bearing (not illustrated) is installed, respectively, the worm 430 may rotate in place.

Since the worm 430 is engaged with the engaging protrusion 421 formed at both side ends of the bracket 420, the engaging protrusion 421 may move upward or downward based on the rotation of the worm 430.

More specifically, since the engaging protrusion 421 may move upward or downward based on the rotation of the worm 430, the bracket 420 wherein the engaging protrusion 421 is installed may move in the same direction as the engaging protrusion 421.

When the bracket 420 moves in either upward or downward, the fixing unit 410 secured to the bracket 420 may also move, and the television 300 installed at the fixing member 410 may also move.

As mentioned above, when the television 300 has ascended above the top of the body 100 with the aid of the ascending and descending means 400, a predetermined space may be formed inside of the body 100.

At this time, since the body 100 may play a role of an enclosure of the speaker 500, the sound from the speaker 500 may sound clean and clear, thus transferring clean and clear sound.

There is an advantage in that while the television viewer watches the television, listening to the sound with a predetermined volume level, for the sound transmitted from the speaker 500, it is possible to output the sound with a variety of tones since the body 100 configured to accommodate the television 300 may be used to play a role of the enclosure.

Since the body 100 configured to accommodate the television 300 may be used as an enclosure of the speaker 500, it does not need to use a predetermined member for forming the enclosure, the space may be maximally used in the present invention, which is an advantageous feature of the present invention.

Figure 4:
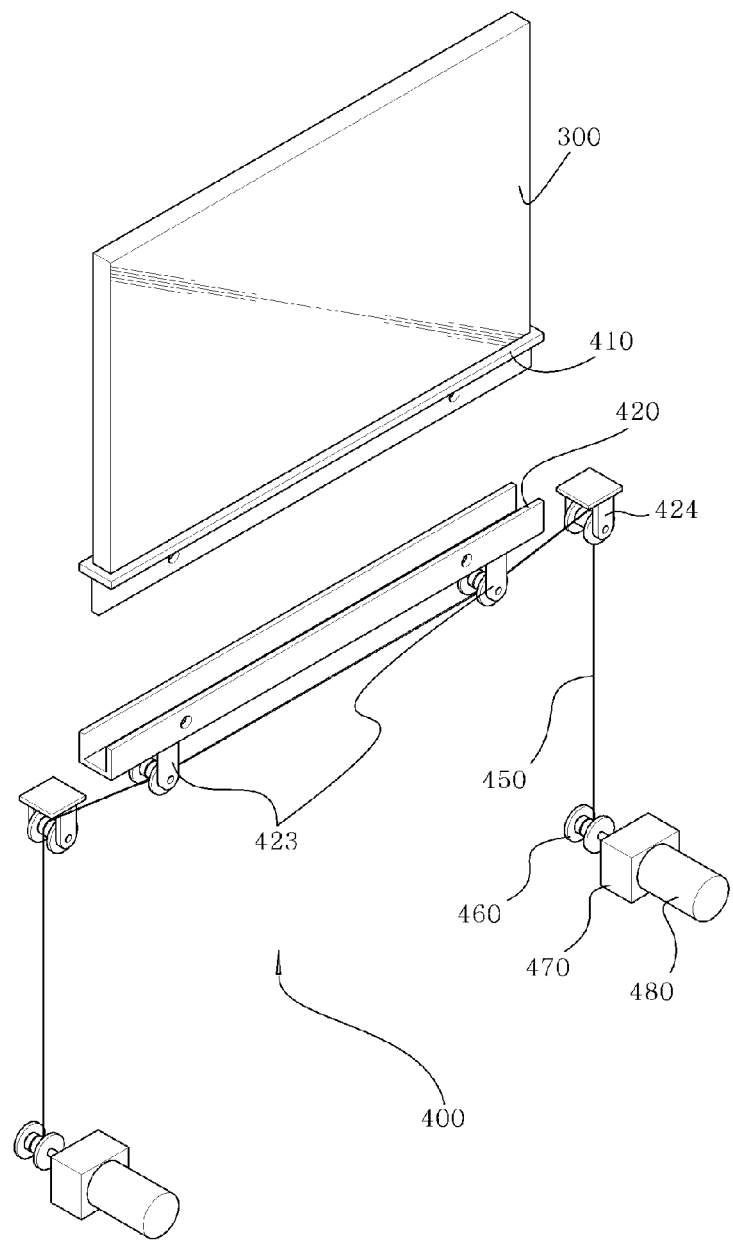
FIG. 4 is a view illustrating a configuration according to another exemplary enibodiment in FIG. 3.

FIG. 4 is a view illustrating a configuration according to another exemplary embodiment in FIG. 2. As illustrated therein, the ascending and descending means 400 may include a fixing unit 410 installed at the bottom of the television 300, a bracket 420 which is secured to the fixing unit 410, a plurality of first pulleys 423 which are installed at the bottom of the bracket 420, a second pulley 425 which is installed inside of the body 100 while being distanced by a predetermined interval from the bracket protrusion 423, a wire 450 hung over the first pulleys 423 and the second pulley 425, a decelerator pulley 460 which winds or unwinds the wire 450, a decelerator 470 which is provided for the decelerator pulley 460 to rotate with a predetermined rotating force, and a motor 480 which is secured for the rotating force to be transferred to the decelerator 470.

In the thusly constituted invention, electric power may be supplied to the motor 480 as soon as the television viewer turns on the electric power so as to watch the television.

When the electric power is supplied to the motor 480, and the motor 480 is driven, the rotating force of the motor 480 is transferred to the decelerator 470, and the rotating force lower than the revolution of the motor 480 is outputted to the decelerator 470, and at the same time, the decelerator pulley 460 is rotated.

The wire 450 one end of which is fixed at the decelerator pulley 460 is wound around the decelerator pulley 460.

When the wire 450 is wound, the wire 450 is supported against the second pulley 425 and is wound, and at this time, the wire 450 is pulled and keeps tensed between the second pulley 425 and the second pulley 425.

Since the wire 425 is pulled, the first pulley 423 secured to the wire 425 moves upward.

When the first pulley 423 moves upward by means of the wire 425, the bracket 420 moves together, and the fixing unit 410 secured to the bracket 420 also moves upward, and then the television 300 may move above the body 100.

Since the procedure for accommodating the television 300 into the interior of the body 100 may be performed in the sequence opposite to the above-described procedure, the description thereof will be omitted.

Since the television 300 comes out above the body 100, it is advantageous that the speaker 500 may use the body 100 as an enclosure.

There is an advantage in that while the television viewer watches the television, listening to the sound with a predetermined volume level, for the sound transmitted from the speaker 500, it is possible to output the sound with a variety of tones since the body 100 configured to accommodate the television 300 may be used to play a role of the enclosure.

FIG. 2 is a view illustrating a configuration according to another exemplary embodiment in FIG. 4. The ascending and descending means 400 may include a fixing unit 410 installed at the bottom of the television 300, a bracket 420 which includes a bracket protrusion 423 and is secured to the fixing unit 410, an ascending and descending bar 440 which is installed in an X-shape, a hinge 441 which is installed where the ascending and descending bar 440 overlaps, a moving member 442 which is installed at the bottom of the ascending and descending bar 440 and includes an engaging hole 443, an engaging member 445 which includes a bearing (not illustrated) and is installed at one side of the moving member 442, a gear rod 444 which is inserted in and engaged with the engaging hole 443 of the moving member 442, thus transferring rotating force, a decelerator 470 which is installed at one side of the gear rod 444, and a motor 480 which is secured to one side of the decelerator 470 for transferring rotating force thereto.

The above-described configuration may be installed inside of the body 100, thus ascending and descending the television.

In the thusly constituted invention, the electric power is supplied to the motor 480 installed inside of the body 100 as soon as the television viewer turns on the electric power of the television 300.

The motor 480 which has received the electric power may be driven for a predetermined time period, and the driving force is transferred as a rotating force to the decelerator 470 which is secured to one side thereof.

Since the motor 480 may rotate fast, the rotations are outputted in a form of constant and low revolutions through the decelerator 470, and the rotating force may be transferred to the gear rod 444 installed at one side of the decelerator 470.

The gear rod 444 may rotate in place by the rotating force of the decelerator 470. Here, the gear rod 444 may rotate efficiently with the aid of the engaging member 445 secured to one side of the gear rod 444.

The moving member 442 secured to the gear rod 444 may move from the center of the gear rod by means of the rotating force thereof to both directions or from both side ends to the direction of the center.

If the moving member 442 moves from both side ends to the direction of the center, the interval of the ascending and descending bar 440 secured to the moving member 442 may be narrowed and may become straightened in the upward direction. At this time, the bracket protrusion 423 secured to the top of the ascending and descending bar 440 may move together with the ascending and descending bar 440.

The bracket 420 wherein the bracket protrusion 423 is installed, may change its position to the upward direction with the aid of the ascending and descending bar 440, and the fixing unit 410 fixed at the bracket 420 may move, so the television 300 may come out above the body 100.

The procedure where the television 300 is accommodated into the body 100 may be the procedure opposite to the above-described procedure, so the description thereof will be omitted.

As described above, in a state where the television has come out above the body 100, the speaker may use the body 100 as an enclosure, so it is possible to transfer clean and clear sound.

In addition, the accommodation of the television 300 and the enclosure of the speaker 500 may be implemented using one body 100, so it is advantages that the whole thickness of the television 300 may become very thin, and the manufacturing does not cost a lot.

In addition, the body 100 accommodates the television 300, so the parents may regulate the television watching time of the kids, and any temptation for watching the television 300 may be prevented, for which the kids may more intensively focus on studying.

Figure 5:
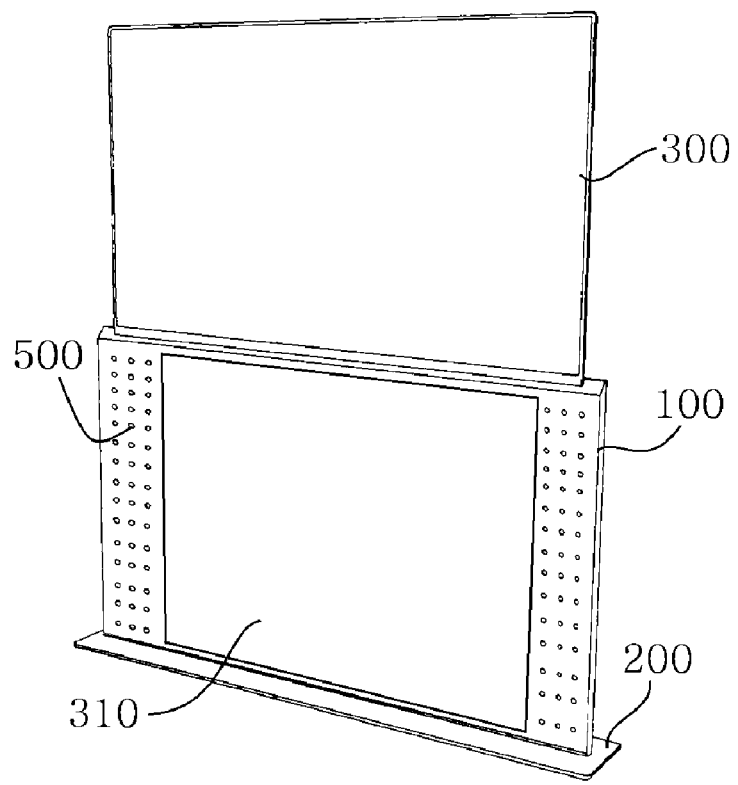
FIG. 5 is a view illustrating a configuration according to another exemplary embodiment in FIG. 1.

FIG. 5 is a view illustrating a configuration according to another exemplary embodiment in FIG. 1. As illustrated therein, the speaker 500 may be detachably secured to the front surface of the body 100.

The reason why the speaker 100 is detachably secured to the front surface of the body 100 is that the television viewer may set his favorite compass range by combining a high-pitched tone speaker, a middle-pitched tone speaker and a low-pitched tone speaker as the television viewer wishes, so the television viewer may enjoy the sound that he wants to listen to.

Figure 6:
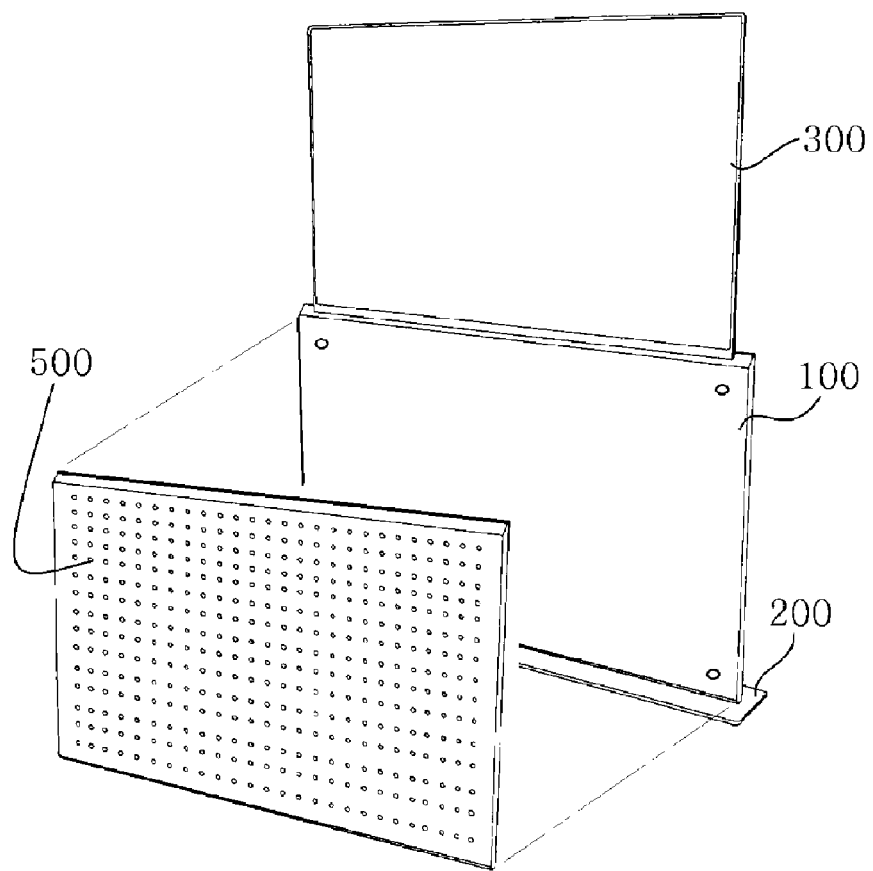
FIG. 6 is a view illustrating a configuration according to further another exemplary embodiment in FIG. 1.
Figure 7:
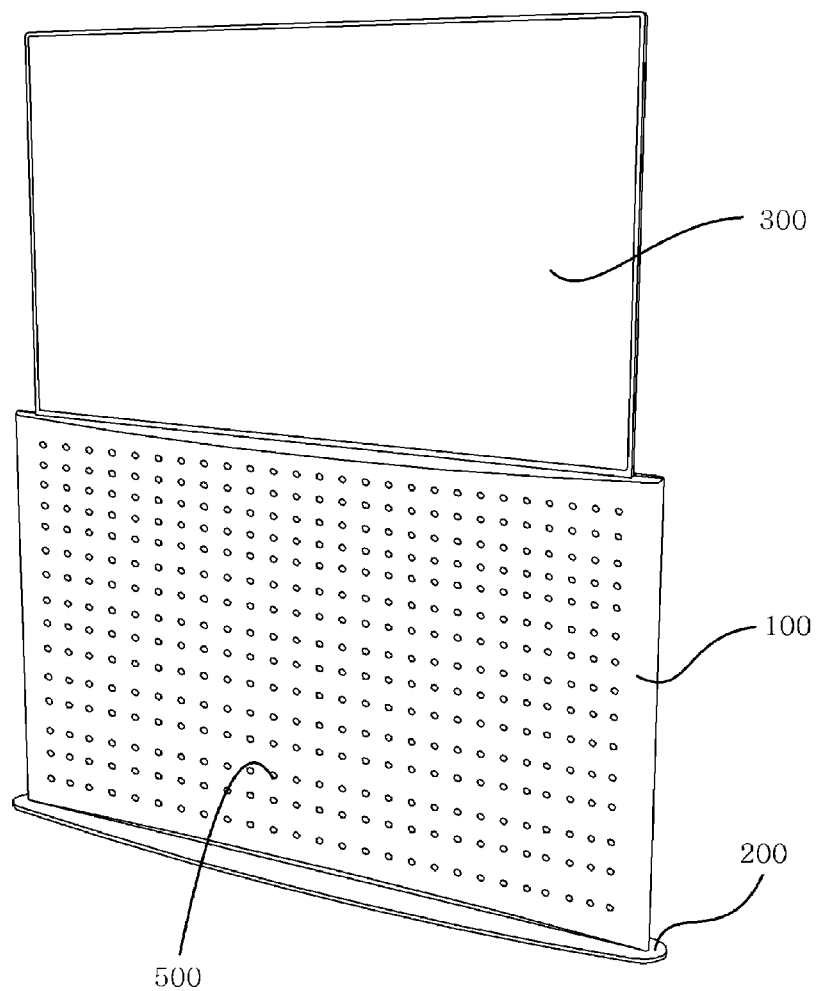
FIGS. 7 to 10 are perspective views illustrating that a speaker device for a television may be configured in various shapes according to the present invention.
Figure 8:
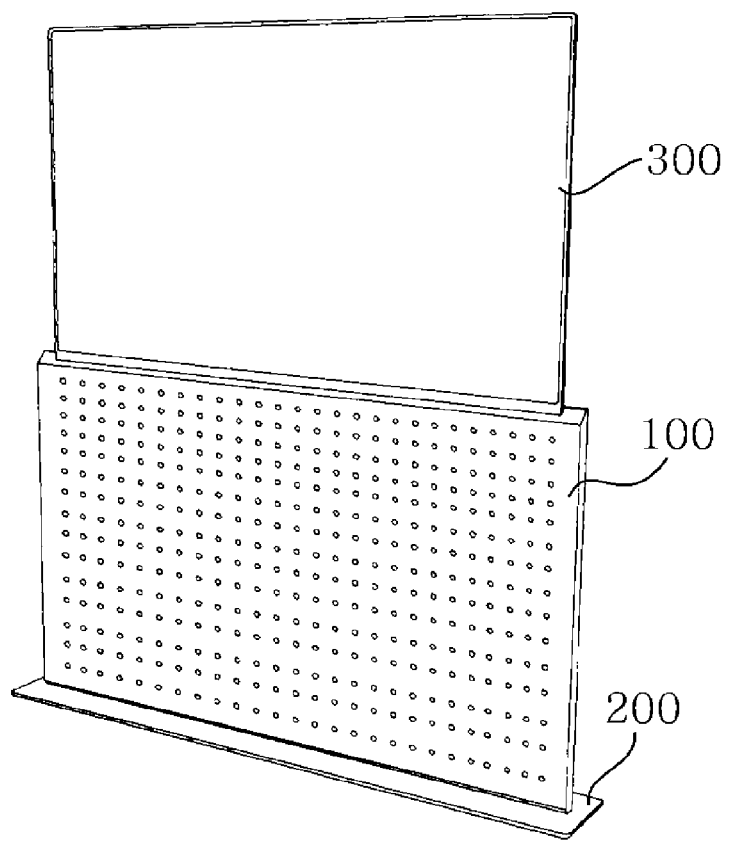
Figure 9:
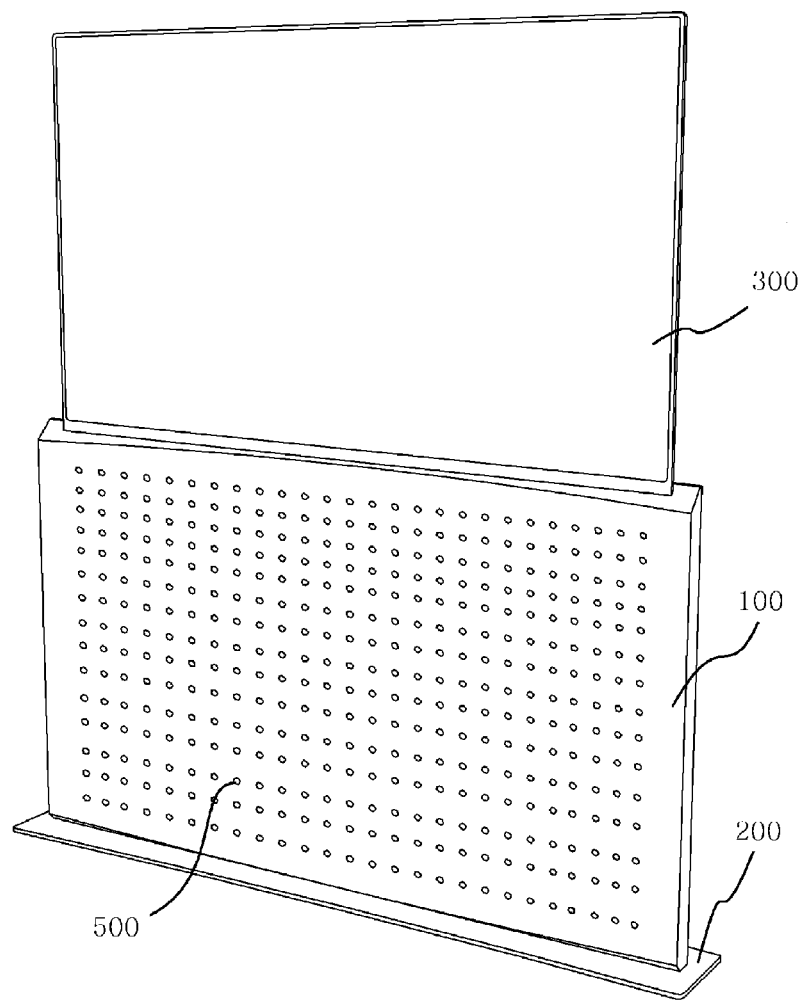
Figure 10:
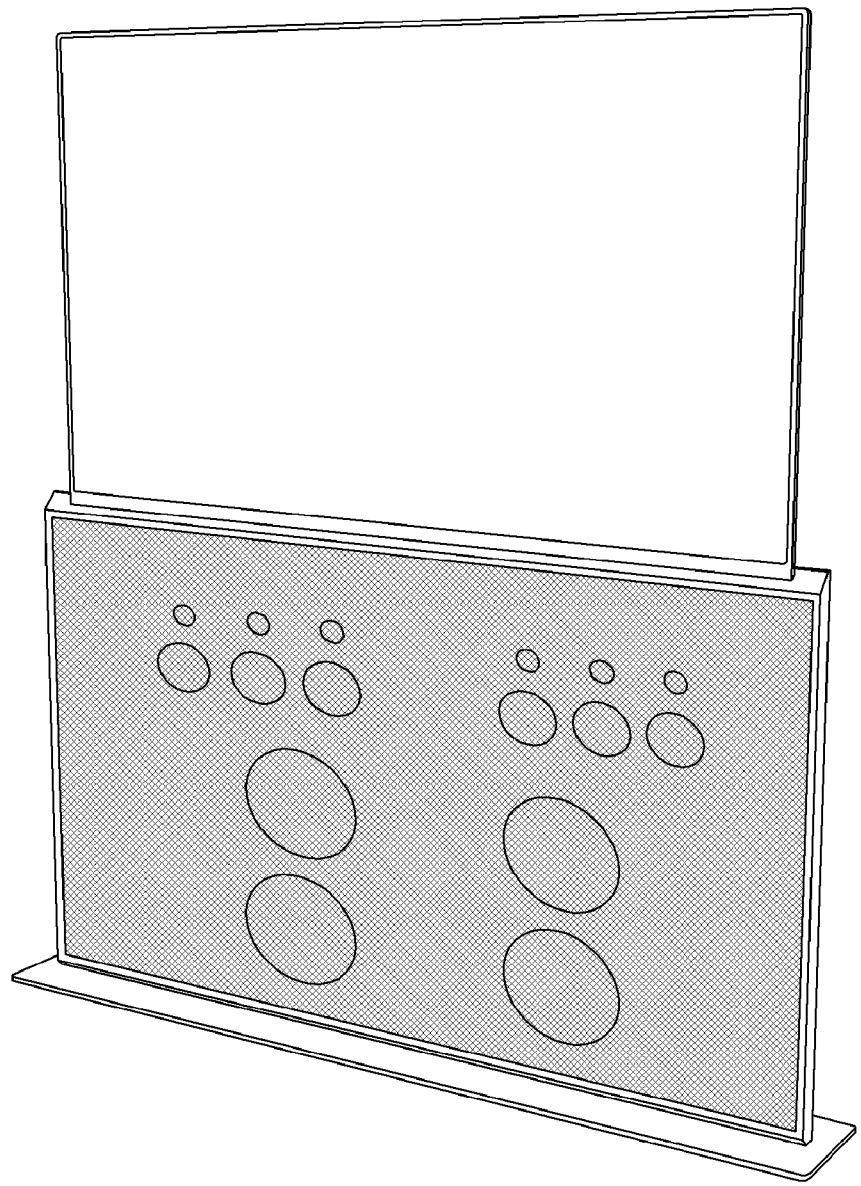

FIG. 6 is a view illustrating a configuration according to further another exemplary embodiment in FIG. 1. As illustrated therein, the monitor 310 and the speaker 500 may be installed at the front surface of the body 100.

The control is performed using the main board (not illustrated) of the television 300 of the monitor 310.

The monitor 310 may provide a function for the television viewer to set various environments of the television 300. The monitor 310 may include a function for watching broadcasts like the television 300 and a function for displaying family photos, scene images, etc.

That the photos or scenes are displayed is like a function of an electronic photo frame, so it does not need to separately purchase such an electronic photo frame, which may bring advantages.

As illustrated in FIG. 6, since the present invention may provide the function of the television 300, the function of the electronic photo frame, and the function of the enclosure of the speaker 500, it is advantageous that the television viewer may express the images in various forms using the television 300.

As illustrated in FIGS. 7 to 10, since the product of the present invention may be manufactured in various shapes, it is advantageous that people who want to purchase the television 300 may select his own favorite product as he wishes.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A speaker device for a television, comprising:
   a body which includes a space inside of the body for accommodating the television, wherein the top of the body is open, and the body plays a role of an enclosure when the television is lifted;
   a speaker which is installed at a front surface of the body; and
   a support which is installed at the bottom of the body, wherein the body comprises:
   a fixing unit which is installed at the bottom of the television;
   a bracket having an engaging protrusion formed at both sides of the fixing unit and being secured to the fixing unit;
   an engaging protrusion which has a via hold at both sides of the bracket and is integrally formed;

a worm which is fixed at a fixing member at the top and bottom of which a bearing is disposed, thus transferring rotating force to the engaging protrusion;

a worm wheel which is engaged so as to transfer the rotating force to the worm;

a decelerator which is engaged so as to transfer the decelerated rotating force to the worm wheel; and a motor which is secured to one side of the decelerator for transferring rotating force and is installed inside of the body, and wherein when the bracket moves in either upward or downward, the fixing unit secured to the bracket moves, and the television installed at the fixing member moves.

2. The device of claim 1, wherein the speaker is detachably installed at a front surface of the body.

3. The device of claim 1, wherein the speaker and a monitor are integrally formed at a front surface of the body.

4. A speaker device for a television, comprising:

a body which is configured to play a role of an enclosure of a speaker installed at a front surface thereof, when a television moves upward above the body, the body, comprises: a fixing unit which is installed at the bottom of the television;

a bracket having an engaging protrusion formed at both sides of the fixing unit and being secured to the fixing unit;

an engaging protrusion which has a via hole at both sides of the bracket and is integrally formed;

a worm which is fixed at a fixing member at the top and bottom of which a bearing is disposed, thus transferring rotating force to the engaging protrusion;

a worm wheel which is engaged so as to transfer the rotating force to the worm;

a decelerator which is engaged so as to transfer the decelerated rotating force to the worm wheel; and a motor which is secured to one side of the decelerator for transferring rotating force and is installed inside of the body, and wherein when the bracket moves in either upward or downward, the fixing unit secured to the bracket moves, and the television installed at the fixing member moves.

\* \* \* \* \*